United States Patent
Imamura et al.

(10) Patent No.: US 10,981,572 B2
(45) Date of Patent: Apr. 20, 2021

(54) METHOD OF CONTROLLING DRIVING FORCE OF VEHICLE

(71) Applicant: Mazda Motor Corporation, Hiroshima (JP)

(72) Inventors: Yasumasa Imamura, Hiroshima (JP); Yasushi Yagi, Hiroshima (JP); Akihiro Tatara, Aki-gun (JP); Tetsushi Marutani, Higashihiroshima (JP); Hideki Tani, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 223 days.

(21) Appl. No.: 16/145,526

(22) Filed: Sep. 28, 2018

(65) Prior Publication Data
US 2019/0100203 A1 Apr. 4, 2019

(30) Foreign Application Priority Data

Sep. 29, 2017 (JP) .............................. JP2017-190938

(51) Int. Cl.
*B60W 30/188* (2012.01)

(52) U.S. Cl.
CPC ....... *B60W 30/188* (2013.01); *B60W 2552/40* (2020.02); *B60W 2720/403* (2013.01)

(58) Field of Classification Search
CPC ......... B60W 30/188; B60W 2720/403; B60W 2552/40
See application file for complete search history.

(56) References Cited

U.S. PATENT DOCUMENTS

| 6,015,192 A * | 1/2000 | Fukumura | B60T 8/172 303/140 |
| 2014/0136062 A1* | 5/2014 | Mita | B60K 23/0808 701/65 |
| 2016/0236672 A1* | 8/2016 | Yanagida | B60W 30/18136 |

FOREIGN PATENT DOCUMENTS

| JP | 5179891 B2 | 4/2013 |
| JP | 2018075852 A | 5/2018 |
| WO | 2018084253 A1 | 5/2018 |

* cited by examiner

*Primary Examiner* — Hunter B Lonsberry
*Assistant Examiner* — Mathew Franklin Gordon
(74) *Attorney, Agent, or Firm* — Alleman Hall Creasman & Tuttle LLP (57) ABSTRACT

A method of controlling driving force of a vehicle includes estimating a first maximum road surface frictional coefficient based on a driving stiffness defined by a micro slip ratio and driving force of drive wheels, in a first driving state where the vehicle travels straight at a constant acceleration, estimating a second maximum road surface frictional coefficient based on a steering reaction force detected by an electric power steering device, in a second driving state different from the first state and where the vehicle is steered, estimating a third maximum road surface frictional coefficient to be a given value in a third driving state different from the first and second states and where an outdoor air temperature is above a determination temperature, and controlling the driving force to settle within a friction circle defined by each of the highest frictional coefficients and a ground contact load of the drive wheels.

9 Claims, 6 Drawing Sheets

METHOD OF CONTROLLING DRIVING FORCE OF VEHICLE

TECHNICAL FIELD

The present disclosure relates to a method of controlling a driving force of a vehicle by using a maximum road surface frictional coefficient (μ) obtained by estimation.

BACKGROUND OF THE DISCLOSURE

Conventionally, four-wheel drive vehicles (4WDs) are known in which a driving force from an engine is transmitted to front or rear wheels, the transmitted driving force is partially transmitted to the other front or rear wheels via a driving force distribution mechanism (e.g., an electronically-controlled coupling), and, by controlling this driving force distribution, more suitable driving characteristics of the vehicle is secured.

Normally in a four-wheel drive vehicle, in principal, a possibility of main drive wheels slipping is determined using a friction circle corresponding to a performance of the main drive wheels obtained experimentally or empirically, and if the determined possibility deviates from the friction circle of the main drive wheels, the driving force is partially distributed from the main drive wheels to part-time drive wheels. As a result, a driving loss caused by the slip of the main drive wheels is reduced. Here, when a timing for the driving force distribution to the part-time drive wheels is set early regardless of the main drive wheels having more room for performance, fuel efficiency may degrade unnecessarily due to a driving loss caused by a slip of the part-time drive wheels, a mechanical loss of a drive system due to the driving force distribution to the part-time drive wheels, etc. Therefore, by setting the driving force distribution timing for the part-time drive wheels as late as possible to the extent that the performance of the main drive wheels reaches its limit, a significant improvement in fuel efficiency can be expected.

Since a largest frictional force corresponding to the radius of the friction circle is proportional to a maximum road surface frictional coefficient (μ) corresponding to a largest driving force, improving the calculation precision of the maximum road surface μ is an urgent task for controlling the driving force of the vehicle. For example, when a temperature of outdoor air is high (e.g., 10° C. or above), it can be assumed that the weather is sunny and the traveling road surface is dry, and therefore the maximum road surface μ can be estimated to be high. Further, JP5179891B discloses a road surface frictional coefficient estimating device including a steering assist detecting module which detects a steering assist force of a power steering device, and a steering operation amount detecting module which detects a vehicle driver's steering operation amount. A road surface frictional coefficient is estimated based on the time from when the steering operation amount is detected until the steering assist force exceeds a given value. Thus, the maximum road surface μ can be estimated via the steering assist force, a so-called steering reaction force, when a steering wheel is controlled.

Meanwhile, within a micro slip range, a slip ratio and the driving force (driving torque) are assumed to be in a relationship of a linear function passing through the origin, and therefore, it is possible to obtain a driving stiffness based on a relationship between the slip ratio and an actual torque of an engine which is a driving source. The present applicant already focused on the driving stiffness and proposed an art for estimating a maximum road surface μ based on this driving stiffness (JP2016-216934A).

In a case of estimating the maximum road surface μ by using an outdoor air temperature, although a simple configuration may be applied for control processing, a traveling state of the vehicle is not taken into consideration whatsoever and only the environmental condition which is the outdoor air temperature is used to estimate the maximum road surface μ, and thus, a reliable estimation result cannot be expected. Further, with the road surface frictional coefficient estimating device of JP5179891B, since the maximum road surface μ is estimated by taking the traveling state of the vehicle into consideration, the maximum road surface μ which is accurate to some extent can be considered to be obtained. However, since the traveling mode of the vehicle is roughly divided into a linear traveling mode and a turning mode and acceleration and deceleration are performed in these traveling modes, in the art of JP5179891B, the maximum road surface μ can only be estimated within a specific operating range in which the steering operation is performed. Similarly in the art of JP2016-216934A, the maximum road surface μ can only be estimated within a specific range in which a ground contact load W is constant.

That is, the operating range in which the maximum road surface μ can be estimated is strictly limited in both of JP5179891B and JP2016-216934A, and no specific art for expanding the operating range in which the accurate maximum road surface μ is estimatable, which can be put into practical use, has been proposed. Therefore, to further improve the fuel efficiency, an art for expanding the estimatable range of the accurate maximum road surface μ needs to be established.

SUMMARY OF THE DISCLOSURE

The purpose of the present disclosure is to provide a method of controlling a driving force of a vehicle, in which an estimatable range of an accurate maximum road surface μ is expanded.

According to one aspect of the present disclosure, a method of controlling a driving force of a vehicle is provided, which includes performing a first estimation in which a first maximum road surface frictional coefficient is estimated based on a driving stiffness defined by a micro slip ratio and the driving force of drive wheels, in a first driving state where the vehicle travels straight at a constant acceleration, performing a second estimation in which a second maximum road surface frictional coefficient is estimated based on a steering reaction force detected by an electric power steering device, in a second driving state different from the first driving state and where the vehicle is steered, performing a third estimation in which a third maximum road surface frictional coefficient is estimated to be a given value in a third driving state different from the first and second driving states and where a temperature of outdoor air is above a determination temperature, and performing a driving force control in which the driving force of the drive wheels is controlled to settle within a friction circle defined by each of the maximum road surface frictional coefficients and a ground contact load of the drive wheels.

According to this method, since the first estimation estimates the first maximum road surface frictional coefficient (μ) based on the driving stiffness corresponding to the slip ratio and the driving force in the first driving state where the vehicle travels straight at the constant acceleration, the maximum road surface μ is estimated via the driving stiffness regardless of a traveling environment etc., within the micro slip range when traveling straight at the constant acceleration which occurs frequently.

Moreover, in the second driving state which is different from the first driving state and where the vehicle is steered, the second estimation estimates the second maximum road surface μ based on the steering reaction force, and in the third driving state which is different from the first and second driving states and where the outdoor air temperature is above the determination temperature, the third estimation estimates the third maximum road surface μ to be the given value. Therefore, the maximum road surface μ is estimated for each of the second and third driving states. Additionally, since the driving force control which controls the driving force by using the estimated maximum road surface μ is performed, the driving force distribution timing is optimized for each of the first to third driving states, and a significant improvement in fuel efficiency is expected.

In the driving force control, the driving force may be controlled using one of the maximum road surface frictional coefficients used previously, in a fourth driving state different from the first to third driving states.

According to this configuration, even in a fourth driving state different from the first to third driving states, the driving force is controlled using the maximum road surface μ reflecting the immediately previous driving state.

In the first estimation, a road surface frictional coefficient corresponding to the driving stiffness acquired by the vehicle may be set as the first maximum road surface frictional coefficient by referring to a driving stiffness-frictional coefficient map in which the driving stiffness and the road surface frictional coefficient form a linear relationship.

According to this configuration, the correlation between the driving stiffness and the first maximum road surface μ is maintained without requiring complicated control processing.

The vehicle may be a four-wheel drive vehicle including an electronically-controlled coupling configured to distribute power of a driving source to front wheels and rear wheels, and the first to third estimations and the driving force control are applied to the front wheels.

In the driving force control, the electronically-controlled coupling may distribute the driving force of the front wheels to the rear wheels so that the driving force of the front wheels settles within the friction circle.

According to the method of the present disclosure, the manner and order of estimations are suitably set for respective operating states, and therefore, the estimatable range of the accurate maximum road surface μ can be expanded.

DETAILED DESCRIPTION OF THE DISCLOSURE

Hereinafter, an embodiment of the present disclosure will be described in detail with reference to the accompanying drawings. The following description exemplifies a case where the present disclosure is applied to a driving force control device of a four-wheel drive vehicle and is not to limit the present disclosure, an application thereof, or a usage thereof.

First Embodiment

Hereinafter, a first embodiment of the present disclosure will be described with reference to FIGS. 1 to 6. A vehicle of this embodiment includes a driving force control device 1 and is a four-wheel drive vehicle based on a Front-engine, Front-drive (FF) type vehicle. Specifically, a driving force control device 1 does not perform a four-wheel driving operation all the time but is suitably switchable between a two-wheel driving state and a four-wheel driving state therebetween. Further, this vehicle is formed to be steerable of front wheels 2a and 2b according to an operation of a steering wheel (not illustrated).

Figure 1:
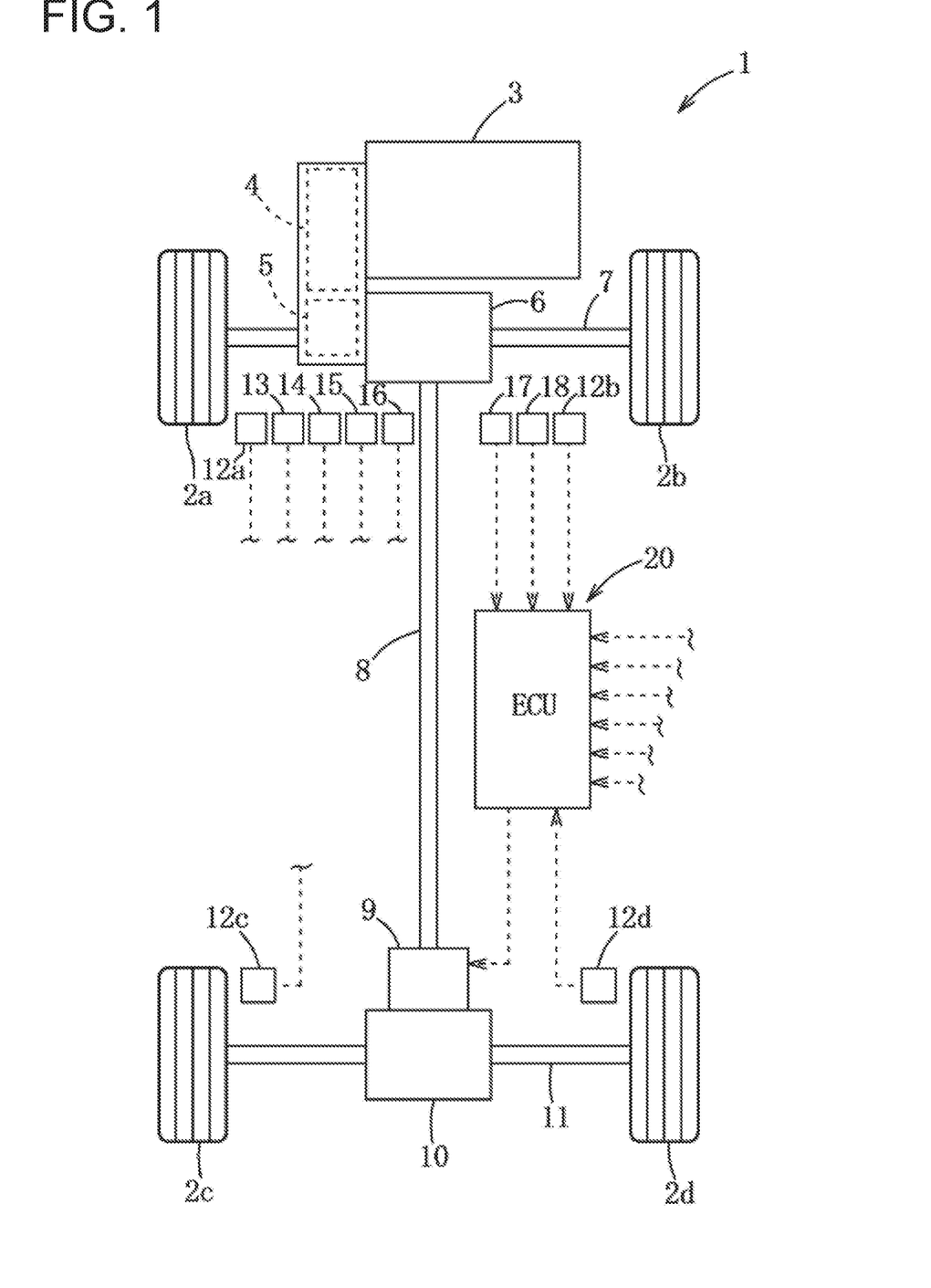
FIG. 1 is an overall configuration view schematically illustrating a vehicle including a driving force control device applying a driving force controlling method according to a first embodiment.

First, an introductory structure of the vehicle will be described. As illustrated in FIG. 1, this vehicle includes an engine 3, a transmission 4, a front-wheel differential device 5, a PTO (Power Take Off) 6, a front-wheel axle 7, a driving force transmission shaft 8, an electromagnetic coupling 9, a rear-wheel differential device 10, a rear-wheel axle 11, wheel speed sensors 12a to 12d, an accelerator sensor 13, an engine speed sensor 14, a gear ratio sensor 15, a current sensor 16, a column torque sensor 17, an outdoor air temperature sensor 18, and an ECU (Electronic Control Unit) 20.

This engine 3 combusts a mixture gas containing fuel and air, generates an engine torque as a propulsion force of the vehicle, and transmits this engine torque to the transmission 4. The transmission 4 is changeable of a gear ratio among a plurality of levels, and transmits the engine torque outputted from the engine 3 to the set gear ratio. Here, the front-wheel differential device 5 converts the engine torque from the engine 3 to driving force, and transmits it to the front wheels 2a and 2b and the PTO 6 (corresponding to a transfer) via the front-wheel axle 7. The PTO 6 transmits the driving force from the transmission 4 to the driving force transmission shaft 8, and this driving force transmission shaft 8 transmits the driving force from the PTO 6 to the electromagnetic coupling 9. The electromagnetic coupling 9 transmits the driving force from the driving force transmission shaft 8 to the rear-wheel differential device 10, and this rear-wheel differential device 10 distributes the driving force from the electromagnetic coupling 9 to rear wheels 2c and 2d via the rear-wheel axle 11.

The electromagnetic coupling 9 couples the driving force transmission shaft 8 to a shaft connecting to the rear-wheel differential device 10, and has an electromagnetic coil, a cam mechanism, a clutch, etc. (none of them illustrated). This electromagnetic coupling 9 changes a largest transmission torque, which is a highest value of the driving force transmitted from the driving force transmission shaft 8 to the rear-wheel differential device 10, according to a current supplied to the electromagnetic coil based on an instruction signal from the ECU 20. The driving force transmitted from the driving force transmission shaft 8 to the rear-wheel differential device 10 is transmitted to the rear wheels 2c and 2d and the driving force exceeding the largest transmission torque is transmitted to the front wheels 2a and 2b.

The wheel speed sensors 12a to 12d detect the wheel speeds of the wheels 2a to 2d, respectively, and the accelerator sensor 13 detects an accelerator opening corresponding to an operation amount of an accelerator pedal (not illustrated) by a vehicle driver. The engine speed sensor 14 detects a rotational speed of a crankshaft (not illustrated) of the engine 3, and the gear ratio sensor 16 detects the gear ratio of the transmission 4. When the transmission 4 is an automatic transmission, a ratio between an input-side speed and an output-side speed of the transmission 4 is detected, and when the transmission 4 is a manual transmission, a position of a shift lever (not illustrated) is detected. The current sensor 16 detects a motor current Am of a power steering (EPS: Electric Power Steering) device (not illustrated), and the column torque sensor 17 detects a torque Tc which acts on a steering column (not illustrated) according to the operation of the steering wheel. The outdoor air temperature sensor 18 detects the temperature outside the vehicle.

These sensors 12a to 12d and 13 to 18 respectively output a detection signal to the ECU 20. The ECU 20 is comprised of a processor 25 such as a CPU (Central Processing Unit), memory 26 comprised of ROM(s) (Read Only Memory) and RAM(s) (Random Access Memory), an input-side interface, an output-side interface, etc. The ROM(s) stores various programs and data for the driving force control, and the RAM(s) is provided with a processing area used when the CPU executes a series of processings.

Figure 2:
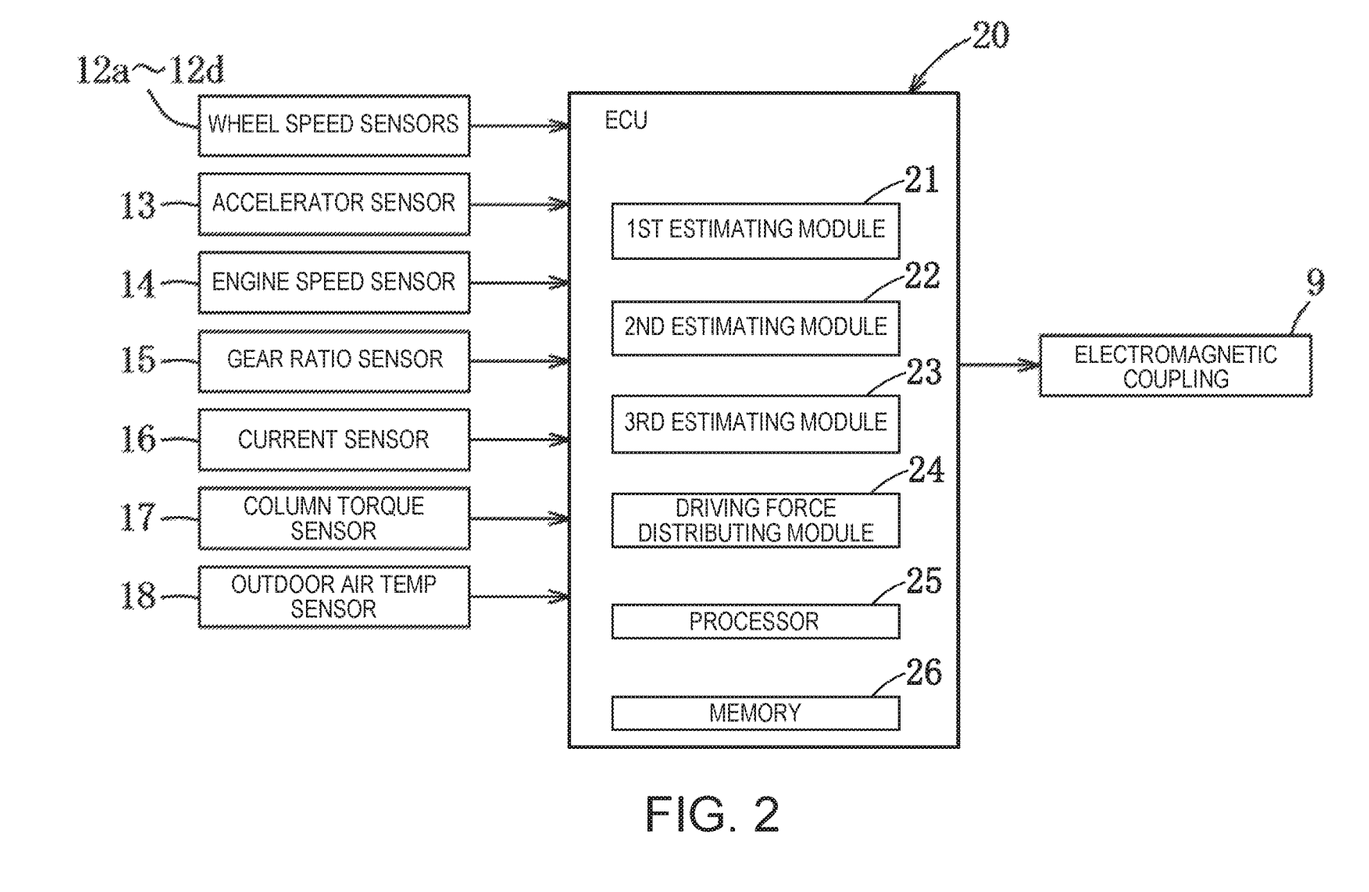
FIG. 2 is a block diagram of the driving force control device.

Next, the driving force control device 1 will be described. The driving force control device 1 distributes part of a driving force F to the rear wheels 2c and 2d (part-time drive wheels) according to a slip possibility which is based on the maximum road surface frictional coefficient (μ) of one of the front wheels 2a and 2b (main drive wheels) of which a slip ratio S is higher than the other front wheel. As illustrated in FIGS. 1 and 2, the driving force control device 1 includes the electromagnetic coupling 9, the sensors 12a to 12d and 13 to 18, and the ECU 20. Note that the following description includes the explanation of a method of controlling the driving force of the vehicle.

The ECU 20 calculates the engine torque outputted from the engine 3 based on the accelerator opening and the engine speed, and calculates the driving force F transmitted from the front wheels 2a and 2b to the road surface based on the engine torque and the gear ratio. The ECU 20 calculates the slip ratios S of the front wheels 2a and 2b based on the detection signals of the wheel speed sensors 12a to 12d. For example, the ECU 20 calculates a pseudo-slip ratio SFa obtained by dividing a difference value between the wheel speed VFa of the front wheel 2a and a vehicle body speed VB by the vehicle body speed VB, and a pseudo-slip ratio SFb obtained by dividing a difference value between the wheel speed VFb of the front wheel 2b and the vehicle body speed VB by the vehicle body speed VB, and sets a higher one of these pseudo-slip ratios SFa and SFb as the slip ratio S representing both the front wheels 2a and 2b. In this embodiment, a slower one of the wheel speeds VRc and VRd of the rear wheels 2c and 2d (part-time drive wheels) is used as the vehicle body speed VB.

As illustrated in FIG. 2, the ECU 20 includes a first estimating module 21, a second estimating module 22, a third estimating module 23, and a driving force distributing module 24. The processor 25 is configured to execute these modules to perform their respective functions. These modules are stored in the memory 26 as software.

First, the first estimating module 21 will be described. In a first driving state where the vehicle travels straight at a constant acceleration, the first estimating module 21 estimates the maximum road surface $\mu_{max}$ based on a driving stiffness D (first estimation). The driving stiffness D can be expressed by a ratio between the slip ratio S of a target wheel and the driving force F of the target wheel within a micro slip range of an S-F characteristic line chart, i.e., a gradient of a linear function on the S-F characteristic line chart. Hereinafter, a frictional coefficient corresponding to a performance limit of the wheel (tire) is expressed as the maximum road surface $\mu_{max}$ in order to differentiate it from the road surface μ (frictional coefficient) while traveling.

Figure 3:
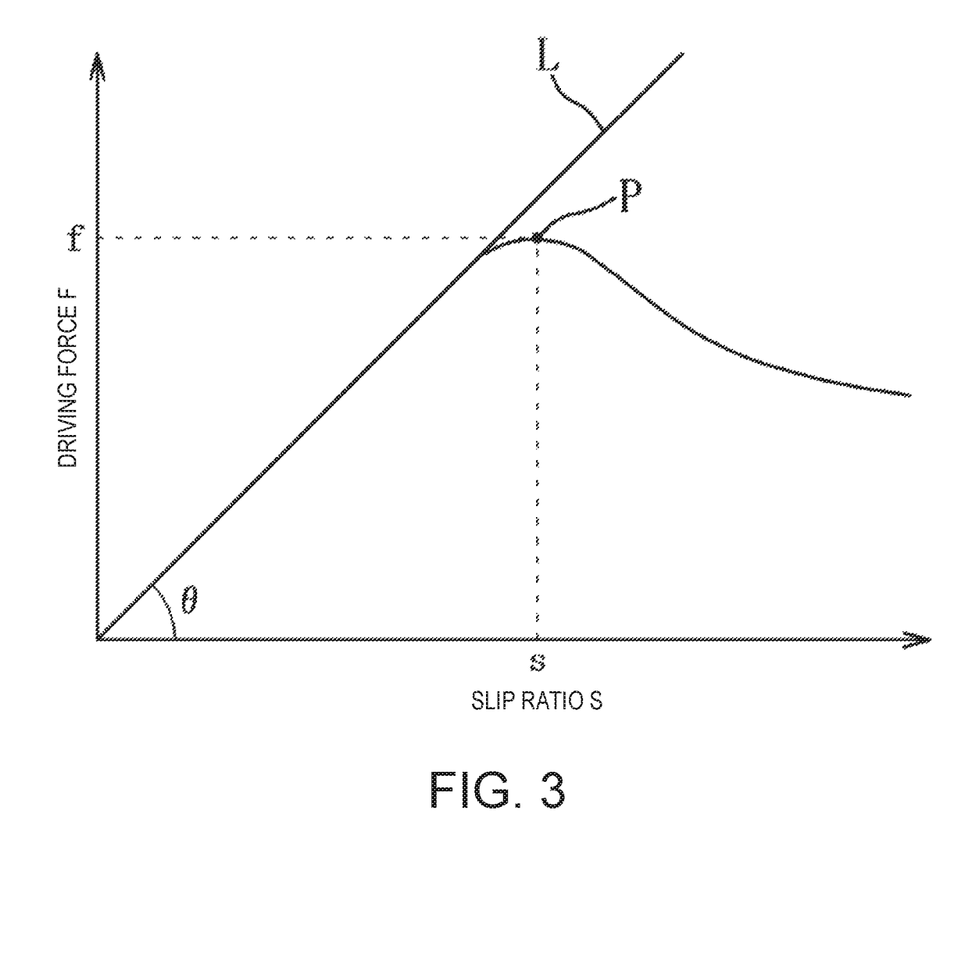
FIG. 3 is an S-F characteristic line chart.

As illustrated in FIG. 3, the S-F characteristic line chart indicates a change characteristic of the driving force F which acts between the wheel and the road surface with respect to the slip ratio S of the wheel while accelerating and braking. When the slip ratio S is zero, the wheel is in a free rolling state, and when the slip ratio S is 1.0 (100%), the wheel is in the locked state. A peak P when the road surface is dry has a slip ratio S of s (around 0.1), and a largest driving force F off. When the driving force is F, the frictional coefficient between the wheel and the road surface is μ, and a ground contact load of the wheel is W, the following Equation 1 is established.

$$F = \mu \times W \qquad (1)$$

Therefore, the road surface μ while traveling is calculated by substituting the driving force F and the ground contact load W into Equation 1, and the maximum road surface $\mu_{max}$ of the peak P is obtained by substituting the largest driving force f, which is the performance limit of the target wheel, and the ground contact load W. Further, within the micro slip range corresponding to the slip ratio of zero to s, the slip ratio S and the driving force F indicate a linear function L with the gradient θ.

The first estimating module 21 calculates a straight line (linear relational expression) connecting the origin to a coordinate point defined by the slip ratio S and the driving force F corresponding to this slip ratio S, and calculates the driving stiffness D based on the gradient of this calculated straight line, by using the following Equation 2.

$$D = F/S \qquad (2)$$

Figure 4:
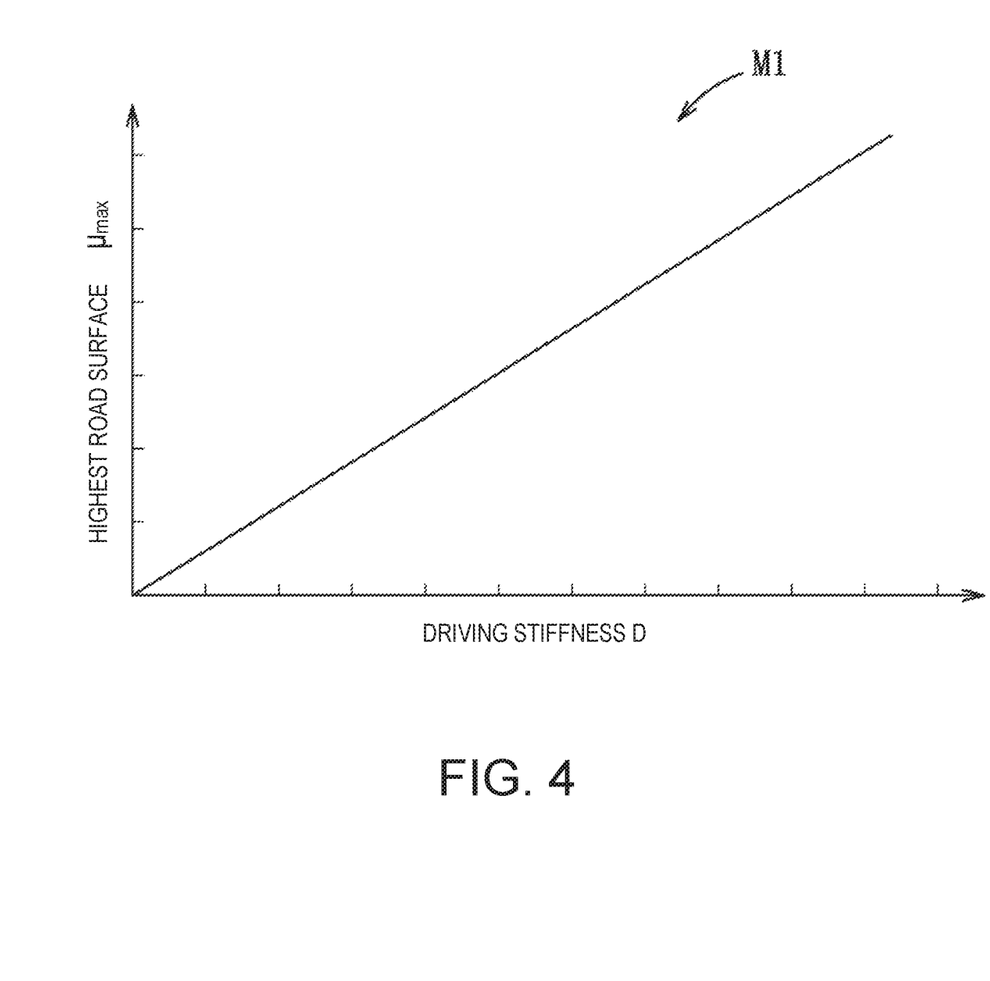
FIG. 4 is a D-μ map.

Further, the first estimating module 21 estimates the maximum road surface $\mu_{max}$ by applying the calculated driving stiffness D to a pre-stored driving stiffness-maximum road surface μ map (hereinafter, referred to as a D-μ map) M1.

According to the present inventors' study, when the ground contact load W is constant, a substantially linear correlation was found between the driving stiffness D and the largest driving force $F_{max}$. That is, while traveling straight at a constant acceleration, which is when the ground contact load W is constant, since the largest driving force $F_{max}$ and the maximum road surface $\mu_{max}$ are in a proportional relationship as indicated by Equation 1, the driving stiffness D and the maximum road surface $\mu_{max}$ have a universally linear correlation regardless of the type of tire with a different tread rigidity and compound performance as indicated by the D-μ, map M1 of FIG. 4. Therefore, it is possible to estimate the maximum road surface $\mu_{max}$ based on the driving stiffness D.

Next, the second estimating module 22 will be described. In a second driving state which is different from the first driving state and where the vehicle is steered, the second estimating module 22 estimates the maximum road surface $\mu_{max}$ based on a steering reaction force Fst which is a parameter of tire reaction (second estimation). The steering reaction force Fst is calculated using the following Equation 3.

$$Fst = |(Am \times K1 + Tc) \times K2| \qquad (3)$$

K1=Torque Constant

K2=(2π×Knuckle Arm Radius)/(Stroke Ratio)

"Am" is the motor current of the power steering device, and "Tc" is the steering column torque.

The second estimating module 22 estimates the maximum road surface $\mu_{max}$ by using the calculated steering reaction force Fst, the ground contact load W and Equation 1 while turning. Note that when a steering angle is large, since the steering reaction force Fst cannot be accurately calculated, a steering angle range may be set for the second driving state. For example, when the calculable steering angle range is set to −500° to 500°, and when it is less than −500° or greater than 500°, the calculation of the steering reaction force Fst is prohibited.

Next, the third estimating module 23 will be described. In a third driving state which is different from the first and second driving states and where the outdoor air temperature is above a determination temperature, the third estimating module 23 estimates the maximum road surface $\mu_{max}$ to be a given value (third estimation). When the outdoor air temperature is above the determination temperature, e.g., above 10° C., it can be estimated that the weather is sunny and the traveling road surface is dry. Therefore, when the outdoor air temperature is above the determination temperature, the third estimating module 23 estimates the maximum road surface $\mu_{max}$ to be a given high $\mu$ value (e.g., 0.8) which is set in advance based on an experience value.

When the vehicle is not in any of the first to third driving states, (i.e., is in a fourth driving state), the ECU 20 sets the maximum road surface $\mu_{max}$ used in a previous driving force control, as the present maximum road surface $\mu_{max}$. This is because the maximum road surface $\mu_{max}$ cannot be estimated from the driving state of the vehicle, and therefore a previous maximum road surface $\mu_{max}$ which is closest to the present maximum road surface $\mu_{max}$ is substituted.

The driving force distributing module 24 controls the driving forces of the front wheels 2a and 2b and the rear wheels 2c and 2d by using the engine torque and the estimated maximum road surface $\mu_{max}$. This driving force distributing module 24 sets a distribution ratio r corresponding to a largest torque transmitted to the rear wheels 2c and 2d based on a distribution ratio map M2 which is stored in the ECU 20 in advance, and distributes a current corresponding to the distribution ratio r to the electromagnetic coupling 9. Note that the driving force of the main drive wheels to the driving force of the part-time drive wheels is set to 100:0 when the distribution ratio r is 0%, and 50:50 when the distribution ratio r is 100%.

Figure 5:
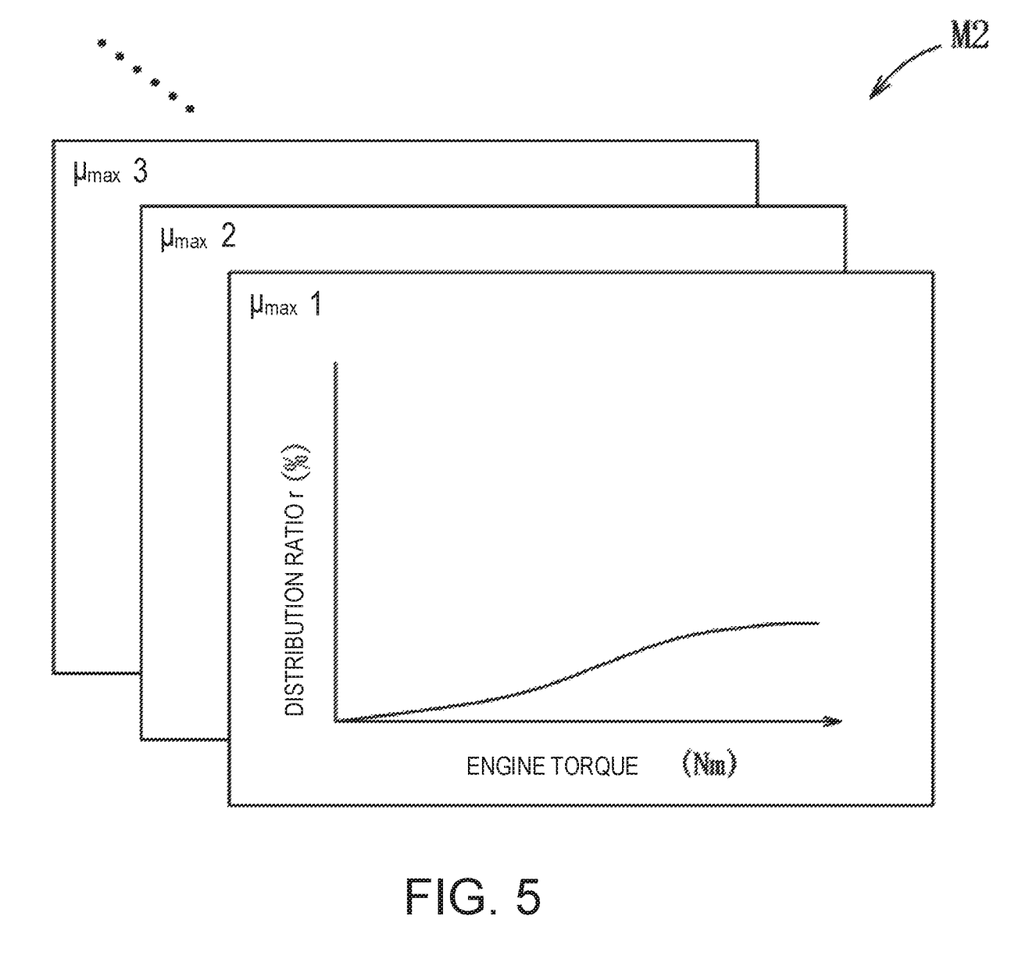
FIG. 5 is a distribution ratio map.

As illustrated in FIG. 5, the distribution ratio map M2 is configured by characteristics defined by the engine torque in a horizontal axis and the distribution ratio r in a vertical axis, and these characteristics are comprised of a plurality of maps set for every maximum road surface $\mu_{max}$. When the engine torque is at a low level, the distribution ratio r is set low. This is because fuel efficiency improves in the two-wheel driving operation by the front wheels 2a and 2b compared to when also distributing the driving force to the rear wheels 2c and 2d. When the engine torque is at a medium level, the distribution ratio r is set to an intermediate value, and when the engine torque is at a high level, the distribution ratio r is set high. This is to reduce a driving loss caused by the slip of the front wheels 2a and 2b by driving the rear wheels 2c and 2d. Further, when the engine torque is constant, the distribution ratio r is set higher as the maximum road surface $\mu_{max}$ is lower. This is because the fuel efficiency improves in the four-wheel driving operation than in the two-wheel driving operation.

Figure 6:
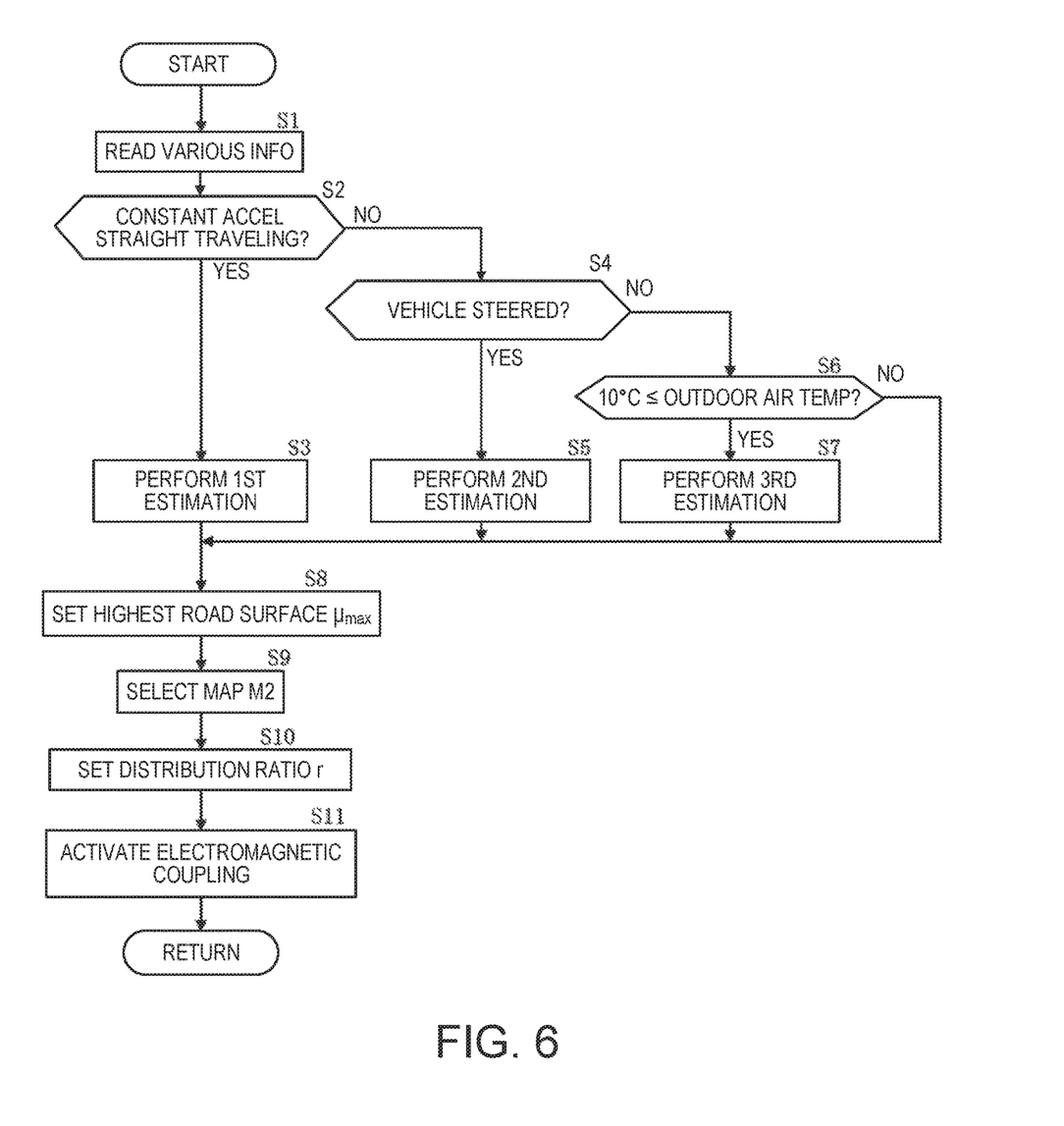
FIG. 6 is a flowchart illustrating a driving force distribution control flow.

Next, a driving force distribution control flow will be described with reference to the flowchart of FIG. 6. Note that Si (i=1, 2, . . . ) indicates a step for each processing. In this driving force distribution control, after the engine 3 is started, the distribution control is executed at, for example, a cycle of 100 msec. As illustrated in the flowchart of FIG. 6, in the driving force distribution control, first at 51, the detection value of each sensor and various information including the D-μ map M1 and the distribution ratio map M2 stored in the ECU 20 are read, and then the process proceeds to S2.

At S2, whether the vehicle is traveling straight at a constant acceleration is determined. If the vehicle is determined to be traveling straight at the constant acceleration as a result of S2, since the ground contact load W of the vehicle is constant, the first estimating module 21 performs the first estimation (S3) and then the process proceeds to S8. If the vehicle is determined to be not traveling straight at the constant acceleration as a result of S2, the process proceeds to S4. At S4, whether the vehicle is steered is determined. If the vehicle is determined to be steered as a result of S4, since the steering reaction force Fst, which corresponds to the tire reaction force, is calculable, the second estimating module 22 performs the second estimation (S5) and then the process proceeds to S8. If the vehicle is determined to be not steered as a result of S4, the process proceeds to S6.

At S6, whether the outdoor air temperature is 10° C. or above is determined. If the outdoor air temperature is determined to be 10° C. or above as a result of S6, since it is assumed that the weather is sunny and the traveling road surface is dry, the third estimating module 23 performs the third estimation (S7), and then the process proceeds to S8. If the outdoor air temperature is determined to be below 10° C. as a result of S6, the process proceeds to S8. At S8, the maximum road surface $\mu_{max}$ estimated by one of the first to third estimating modules 21 to 23 is set as the present maximum road surface $\mu_{max}$, and if no maximum road surface $\mu_{max}$ is estimated by any of the first to third estimating modules 21 to 23, the maximum road surface $\mu_{max}$ used in the previous driving force control is set as the present maximum road surface $\mu_{max}$, and the flow proceeds to S9.

At S9, a given distribution ratio map M2 corresponding to the set maximum road surface $\mu_{max}$ is selected from the plurality of maps M2 and the process proceeds to S10. At S10, the distribution ratio r is set using the selected given distribution map M2 and the engine torque. Then at S11, the electromagnetic coupling 9 is activated by the power distribution according to the distribution ratio r and the flow returns.

Next the operations and effects of the driving force controlling method of this embodiment will be described. In this driving force controlling method, the first estimating module 21 (first estimation: S3) which estimates the maximum road surface $\mu_{max}$ based on the driving stiffness D corresponding to the slip ratio S and the driving force F in the first driving state where the vehicle travels straight at the constant acceleration is provided. Therefore, the maximum road surface $\mu_{max}$ is estimated via the driving stiffness D regardless of the traveling environment, etc., within the micro slip range when traveling straight at the constant acceleration which occurs frequently. Moreover, the second estimating module 22 (second estimation: S5) which estimates the maximum road surface $\mu_{max}$ based on the steering reaction force Fst in the second driving state which is different from the first driving state and where the vehicle is steered is provided, and the third estimating module 23 (third estimation: S7) which estimates the maximum road surface $\mu_{max}$ to be the given value in the third driving state which is different from the first and second driving states and where the outdoor air temperature is above the determination temperature is provided. Therefore, the maximum road surface $\mu_{max}$ is estimated for each of the second and third driving states. Additionally, the driving force distributing module 24 (driving force control: S9 to S11) which controls the driving force by using the estimated maximum road surface $\mu_{max}$ is provided. Therefore, the driving force distribution timing is optimized for each of the first to third driving states, and a significant improvement in fuel efficiency is expected.

The driving force distributing module 24 controls the driving force by using the maximum road surface $\mu_{max}$ used in the previous driving force control, in a driving state which is not any of the first to third driving states. Therefore, the driving force is controllable by using the maximum road surface $\mu_{max}$ reflecting the immediately previous driving state even in the driving state other than the first to third driving state.

Since the first estimating module 21 estimates the maximum road surface $\mu_{max}$ by using the D-$\mu$ map in which the correlation between the driving stiffness D and the maximum road surface $\mu_{max}$ is linearly set, the correlation between the driving stiffness D and the maximum road surface $\mu_{max}$ is maintained without requiring complicated control processing.

Since the vehicle includes the engine 3 and the electromagnetic coupling 9 which distributes the driving force from the engine 3 to the front wheels 2a and 2b and the rear wheels 2c and 2d, it is possible to retard as much as possible the driving force distribution timing from the front wheels 2a and 2b, which are the main drive wheels, to the rear wheels 2c and 2d, which are the part-time drive wheels, and a significant improvement in fuel efficiency is expected.

Since the driving force distributing module 24 sets the driving forces of the front wheels 2a and 2b and the rear wheels 2c and 2d by using the engine torque and the maximum road surface $\mu_{max}$, the driving force control is executed using the engine torque and the maximum road surface $\mu_{max}$ which is a grip limit index.

Next, modifications in which the above embodiment is partially modified will be described. (1) In the above embodiment, the example in which the main drive wheels are the front wheels and the part-time drive wheels are the rear wheels is described; however, the main drive wheels may be the rear wheels and the part-time drive wheels may be the front wheels as in a Front-engine, Rear-drive (FR) type vehicle. Further, in the above embodiment, the example in which the driving force of the main drive wheels to the driving force of the part-time drive wheels is set to 100:0 when the distribution ratio r is 0%, and 50:50 when the distribution ratio r is 100% is described; however, a reference driving force distribution may be set, for example, 7:3. In this case, the reference driving force distribution is corrected based on the distribution ratio.

(2) In the above embodiment, the example in which, in the second estimation, the maximum road surface $\mu_{max}$ is estimated to be a value proportional to the steering reaction force is described; however, a given determination threshold may be provided so that a high $\mu$ determination is performed by comparing the steering reaction force to the determination threshold as in the third estimation. Moreover, a plurality of determination thresholds may be provided so that the maximum road surface $\mu_{max}$ is set for each of the determination thresholds.

(3) In the above embodiment, the example of the driving force control using the distribution ratio map set for each maximum road surface $\mu_{max}$ is described; however, the driving force control may be executed using the largest driving force which is a grip limit index. For example, a slip possibility of the main drive wheels is estimated using a friction circle defined by the largest driving force and a lateral force, and the driving force to be distributed to the part-time drive wheels is set based on the relationship between the present driving force and the largest driving force. Thus, the driving force control is executed using the friction circle defined by the largest driving force which is the grip limit index. Further, the driving force of the main drive wheels and the driving force of the part-time drive wheels may be distributed based on a control ratio between the road surface $\mu$ and the maximum road surface $\mu_{max}$.

(4) In the above embodiment, the example switching the driving state of the vehicle from the two-wheel driving state to the four-wheel driving state via the coupling according to the traveling state is described; however, the present disclosure is applicable to both a full-time 4WD or a part-time 4WD. Moreover, it is also applicable to a traction control system.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims. Additionally, those skilled in the art can implement the above embodiments with an addition of various changes without departing from the scope of the present disclosure, and the present disclosure also includes such modifications.

DESCRIPTION OF REFERENCE CHARACTERS

1 Driving Force Control Device
2a, 2b Front-wheel
2c, 2d Rear-wheel
3 Engine
9 Electromagnetic Coupling
20 ECU
S Slip Ratio
D Driving Stiffness

What is claimed is:
1. A method of controlling a driving force of a vehicle, comprising:
    determining that the vehicle is in a first driving state where the vehicle travels straight at a constant acceleration;
    responsive to determining that the vehicle is in the first driving state, performing a first estimation in which a first maximum road surface frictional coefficient is estimated based on a driving stiffness defined by a micro slip ratio and the driving force of drive wheels;
    determining that the vehicle is not in the first driving state and the vehicle is in a second driving state different from the first driving state and where the vehicle is steered;
    responsive to determining that the vehicle is not in the first driving state and the vehicle is in the second driving state, performing a second estimation in which a second maximum road surface frictional coefficient is estimated based on a steering reaction force detected by an electric power steering device;

determining that the vehicle is not in the first driving state or the second driving state and the vehicle is in a third driving state different from the first and second driving states and where a temperature of outdoor air is above a determination temperature;

responsive to determining that the vehicle is not in the first driving state or the second driving state and the vehicle is in the third driving state, performing a third estimation in which a third maximum road surface frictional coefficient is estimated to be a given value; and performing a driving force control in which the driving force of the drive wheels is controlled to settle within a friction circle defined by each of the maximum road surface frictional coefficients and a ground contact load of the drive wheels.

2. The method of claim 1, wherein in the driving force control, the driving force is controlled using one of the maximum road surface frictional coefficients used previously, in a fourth driving state different from the first to third driving states.

3. The method of claim 1, wherein in the first estimation, a road surface frictional coefficient corresponding to the driving stiffness acquired by the vehicle is set as the first maximum road surface frictional coefficient by referring to a driving stiffness-frictional coefficient map in which the driving stiffness and the road surface frictional coefficient form a linear relationship.

4. The method of claim 1, wherein the vehicle is a four-wheel drive vehicle including an electronically-controlled coupling configured to distribute power of a driving source to front wheels and rear wheels, and the first to third estimations and the driving force control are applied to the front wheels.

5. The method of claim 4, wherein in the driving force control, the electronically-controlled coupling distributes the driving force of the front wheels to the rear wheels so that the driving force of the front wheels settles within the friction circle.

6. The method of claim 1, wherein the second maximum road surface frictional coefficient $\mu$ is calculated using Equation 1 while turning by using the calculated steering reaction force $F_{st}$, and the ground contact load W, Equation 1 being expressed as follows:

$$F_{st} = \mu \times W \quad \text{(Equation 1)}.$$

7. The method of claim 6, wherein the steering reaction force $F_{st}$ is calculated using Equation 2 by using a motor current Am of the electric power steering device, torque constant K1, steering column torque Tc, and constant K2 defined as ($2\pi \times$knuckle arm radius)/(stroke ratio), Equation 2 being expressed as follows:

$$F_{st} = |(Am \times K1 + Tc) \times K2| \quad \text{(Equation 2)}.$$

8. The method of claim 1, wherein when a steering angle is less than a first predetermined angle or greater than a second predetermined angle, the estimation of the steering reaction force is prohibited.

9. The method of claim 5, wherein when an engine torque is at a predetermined low level, a distribution ratio is set lower than when the engine torque is at a predetermined high level.

* * * * *